US008975332B2

(12) United States Patent
Mestach et al.

(10) Patent No.: US 8,975,332 B2
(45) Date of Patent: Mar. 10, 2015

(54) PROCESS FOR PREPARING AQUEOUS VINYL POLYMER DISPERSIONS

(75) Inventors: Dirk Emiel Paula Mestach, Nijlen (BE); Mart Heuts, Maria-Hoop (NL); Rob Adolphs, Bavel (NL)

(73) Assignee: Nuplex Resins B.V., Bergen Op Zoom (NL)

( * ) Notice: Subject to any disclaimer, the term of this patent is extended or adjusted under 35 U.S.C. 154(b) by 6 days.

(21) Appl. No.: 14/111,198

(22) PCT Filed: Apr. 11, 2012

(86) PCT No.: PCT/EP2012/056522
§ 371 (c)(1),
(2), (4) Date: Oct. 11, 2013

(87) PCT Pub. No.: WO2012/140042
PCT Pub. Date: Oct. 18, 2012

(65) Prior Publication Data
US 2014/0039122 A1    Feb. 6, 2014

(30) Foreign Application Priority Data
Apr. 11, 2011 (EP) .................... 11161907

(51) Int. Cl.
C08F 2/26 (2006.01)
C08F 2/38 (2006.01)
C08F 265/06 (2006.01)
C09D 5/02 (2006.01)
C09D 151/00 (2006.01)
C09D 7/14 (2006.01)
C09D 151/06 (2006.01)
C08F 220/06 (2006.01)
C08F 220/14 (2006.01)

(52) U.S. Cl.
CPC ... *C09D 7/14* (2013.01); *C08F 2/26* (2013.01); *C09D 5/022* (2013.01); *C08F 265/06* (2013.01); *C09D 151/06* (2013.01); *C08F 220/06* (2013.01); *C08F 220/14* (2013.01)
USPC .......................................... 524/745; 524/831

(58) Field of Classification Search
CPC ............ C08F 2/26; C08F 2/38; C08F 265/06; C09D 5/02; C09D 151/00
USPC ................................................. 524/745, 831
See application file for complete search history.

(56) References Cited

U.S. PATENT DOCUMENTS

| | | | |
|---|---|---|---|
| 4,894,397 A | 1/1990 | Morgan et al. | |
| 5,962,571 A | 10/1999 | Overbeek et al. | |
| 6,258,887 B1 | 7/2001 | Bardman et al. | |
| 6,872,789 B2 | 3/2005 | Brinkhuis et al. | |
| 2002/0013414 A1 | 1/2002 | Ramesh et al. | |
| 2003/0162888 A1 | 8/2003 | Bremser et al. | |
| 2007/0043156 A1 | 2/2007 | Mestach et al. | |
| 2009/0143528 A1 | 6/2009 | Mestach et al. | |

FOREIGN PATENT DOCUMENTS

| | | |
|---|---|---|
| CN | 1965042 A | 5/2007 |
| DE | 10029802 A1 | 1/2002 |
| EP | 0338486 A2 | 10/1989 |
| EP | 338486 A2 * | 10/1989 |
| EP | 0758364 A1 | 2/1997 |
| EP | 1008635 A1 | 6/2000 |
| JP | 3135151 B2 | 2/2001 |
| WO | 95/29963 A1 | 11/1995 |

OTHER PUBLICATIONS

Heuts et al.: 'Influence of morphology on the film formation of acrylic dispersions' ACS Symposium Series vol. 648, 1996, p. 271-285.
T.G. Fox Bull. AM. Phys. Soc. vol. 1, 1956, p. 123.
Hosoi et al., J. Polym. Science, 1984 vol. 22 p. 1365-1372.
Bob Gilbert: 'Emulsion Polymerization, A Mechanistic Approach', 1995, Academic Press p. 245-291.
N. S. Enikolopyan et al. J.Polym.Chem.Ed vol. 19, 1981, p. 879-889.
W. Bremser et al. Prog. Org. Coatings vol. 45, 2002, p. 95-99.

* cited by examiner

*Primary Examiner* — Kelechi Egwim
(74) *Attorney, Agent, or Firm* — Minerva Rivero; David P. Owen; Hoyng Monegier LLP

(57) ABSTRACT

The invention relates to a process for the preparation of aqueous vinyl polymer dispersions having good film forming properties, good stability and in can clarity, to the polymer dispersions obtainable by the process and coating compositions prepared from said polymer dispersions and the use thereof. The process comprising, (1) a first polymerization step comprising (1a) preparing an emulsion (1A) in water of a first monomer mixture (1a1) comprising carboxylic acid functional monomers, a surfactant (1a2) and water soluble inorganic salt (1a3) wherein surfactant (1a2) is a sulfur based anionic surfactant containing less than 60 wt % ethylene oxide and wherein the salt (1a3) content at the start of polymerization (1b) is between 0.01 and 3 gr/kg water, (1b) emulsion polymerizing the obtained emulsion 1A forming a hydroplasticizable first stage polymer particle dispersion (1B) said first stage polymer having a Tg from 10 to 125°, (2) a second polymerization step comprising (2a) adding to dispersion 1B a second monomer mixture (2a1) wherein carboxylic acid functional monomers is present in an amount such that the acid value of the resulting polymer is less than 23 KOH/g and wherein the amount of monomer mixture (2a1) is between 10 and 90 wt % of the total weight of monomers (1a1) plus (2a1), (2b) polymerizing second monomer mixture (2a1) to form a second stage polymer in the first particle dispersion (1B) to form a multiphase particle dispersion (2B).

23 Claims, No Drawings

PROCESS FOR PREPARING AQUEOUS VINYL POLYMER DISPERSIONS

CROSS-REFERENCES TO RELATED APPLICATIONS

This application is a national phase entry of PCT application number PCT/EP2012/056522 filed 11 Apr. 2012, which claims priority to EP application number 11161907.8 filed on 11 Apr. 2011, both applications of which are incorporated by reference in their entirety.

FIELD OF THE INVENTION

The invention relates generally to a process to produce aqueous vinyl polymer dispersions having good film forming properties at low temperature, the polymer dispersions obtainable by the process and coating compositions prepared with said polymer dispersions.

BACKGROUND OF THE INVENTION

Environmental legislation on the use and emission of volatile organic components (VOC) is causing a change from conventional solvent-borne coatings to waterborne coatings. Even though the quality of currently available waterborne coatings is getting close to that of solvent-borne coatings, some significant drawbacks still exist. The most important quality difference is noticeable in waterborne non-pigmented coatings that are used in clear-coats, stains and varnishes on a variety of different substrates. Due to the fact that most waterborne coatings comprise waterborne binders that are composed of dispersed polymer particles, the wet coating will be opaque or milky so it lacks the in-can clarity (ICC) associated with solvent-borne coatings. This property is best described as the ability of visible light to pass through the polymer dispersion. The less light is absorbed and scattered by the vinyl polymer dispersion the better the ICC. The ICC is characterised by the transparency value measurement as described below.

Upon application of the coating, the wet coating layer will have a white to bluish appearance that will slowly disappear upon drying. In many cases the dry waterborne coating will also have a lower level of transparency compared to a solvent-borne coating. In a number of applications such as clear wood-coatings, these effects are highly undesirable so there is a need for waterborne coatings that have improved wet and dry coating clarity. One of the reasons for bad dry film clarity is insufficient film-formation or coalescence. In order to promote coalescence, waterborne coatings still contain significant amounts of VOC to reduce the minimal film-formation temperature (MFT) of the polymer dispersion.

When a waterborne coating is required that has good hardness, block and print resistance, the polymer dispersion should have a glass transition temperature (Tg) well above ambient temperature. In particular for such high Tg polymers, the level of VOC required for making sure that proper film formation takes place at ambient temperatures or below, will be too high to meet the current maximum level allowed by legislation. Therefore reduction of the MFT can no longer depend solely on the plasticizing effect of organic solvents.

A number of approaches have been developed to achieve reduction of MFT at ambient temperatures or below by designing the morphology of the dispersed polymer particles in vinyl polymers dispersions. Examples of such approaches are discussed by Heuts et al. in "Influence of morphology on the film formation of acrylic dispersions" ACS Symposium Series (1996), 648 (Film Formation in Waterborne Coatings), 271-285, where combinations of hard and soft polymer fractions either as blends or in sequential polymerization are described. However, having a significant amount of low Tg polymer present in the polymer composition will have a negative influence on the coating properties such as chemical resistance, hardness and block resistance.

EP0758364 (WO95-29963, Overbeek et al.) describes an aqueous composition having an optimized compromise of on one hand film forming properties and on the other hand coating properties, in particular Koenig hardness. The composition comprises a low molecular weight hydrophilic first stage polymer (oligomer). A draw-back of the process used is the fact that the oligomer has to be dissolved by the addition of a base prior to the polymerization of the second stage polymer. The alkaline solution of the oligomer acts as a polymeric dispersant stabilizing the second stage polymer. The oligomer is provided with crosslinkable groups to reduce water-sensitivity in the resulting coating caused by the low molecular weight hydrophilic oligomer. Further, inevitably the pH of the final polymer dispersion will be alkaline which is often not desirable for example when used in coatings for alkali sensitive substrates such as oak. Furthermore, the molecular weight of the oligomer must be relatively low to prevent that the viscosity of the alkaline solution will become too high or the dispersant action of the solubilized first stage polymer will be lost resulting in the formation of a product with a broad particle size distribution, lacking transparency and substantial formation of coagulum. Low molecular weight hydrophilic components are a disadvantage for the resulting coating properties.

EP 1008 635 B1 (Bardman et al.) describes a core-shell polymer where a first polymer contains from 0.5% to 7%. preferably from 1% to 5%, of a copolymerized monoethylenically unsaturated ionic monomer, based on the weight of the first polymer. A second polymer is polymerized in the presence of the first polymer. In this second polymer 0.25% to 6% (based on the weight of said second polymer) of copolymerized multi-ethylenically unsaturated monomer has to be present in the second stage. This patent uses a reactor precharge with a low concentration of inorganic salts, but there is no mention of the type of surfactant needed to obtain the desirable combination of properties. Even though a particle size from 30 to 500 nm is mentioned, all examples have particle sizes above 90 nm, so the dispersions do not have the required in can clarity. The use of chain-transfer agents is mentioned, but the patent is silent about the molecular weight range needed to have a good balance between minimal film-formation temperature and hardness.

SUMMARY OF THE INVENTION

The problem of the invention is to provide a process for the preparation of an aqueous dispersion of a vinyl polymer and to provide an aqueous dispersion obtainable by said process which dispersion has good film forming properties on one hand and good coating properties on the other hand and which does not have one or more of the above-mentioned disadvantages of the prior art.

According to the invention this problem has been solved by providing a process for the preparation of an aqueous dispersion of hydroplasticisable multiphase vinyl polymer particles comprising,
(1) a first polymerization step comprising
(1a) preparing an emulsion (1A) in water of a first monomer mixture (1a1), a surfactant (1a2) and a water soluble inorganic salt (1a3), wherein the first monomers mixture (1a1) comprises
1) carboxylic acid functional monomers,
2) optional crosslinking monomers other than 1
3) vinyl monomers other than 1) and 2) and
4) optional chain transfer agents,
wherein surfactant (1a2) is a sulfur based anionic surfactant containing less than 60 wt % ethylene oxide and
wherein the water soluble inorganic salt (1a3) content at the start of polymerization (1b) is between 0.01 and 3 g/kg water,
(1b) emulsion polymerizing the obtained emulsion 1A forming a hydroplasticisable first stage polymer particle dispersion (1B) said first stage polymer having a Tg from 10 to 125° C.,
(2) a second polymerization step comprising
(2a) adding to dispersion 1B a second monomer mixture (2a1) comprising
1) monomers chosen from the same group as in the first monomer mixture (1a1)
2) optional monomers (2a2) comprising 2 or more ethylenically unsaturated groups for pre-crosslinking, preferably in an amount less than 2 wt %,
wherein carboxylic acid functional monomers in the second monomer mixture is present in an amount such that the acid value of the resulting second polymer is less than 23 KOH/g and
wherein the amount of monomer mixture (2a1) is between 10 and 90 wt % of the total weight of monomer mixtures (1a1) plus (2a1)
(2b) polymerizing second monomer mixture (2a1) to form a second stage polymer in the first particle dispersion (1B) to form a multiphase particle dispersion (2B),
(3) optionally hydroplasticising the multiphase particle dispersion (2B) by addition of base, preferably a volatile base, to a pH between 6.5 and 10.
(4) optionally adding a separate crosslinking agent for reaction with crosslinking monomers in monomer mixtures (1a1) or (2a1) or with unsaturated groups (2a2)

In the conditions as specified in the process according to the invention, a well defined particle size and particle size distribution are obtained in the first polymer dispersion, typically below 80 nm but even below 50 nm (expressed as the Z-average mean as measured by photon correlation spectroscopy), which particles can then be grown in the second polymerization step to the desired final particle size. The resulting polymer dispersion 2B has a good stability, a small particle size and very good in can clarity even at relatively high solid contents.

It is noted that in the second polymerisation step the second monomer mixture is added to dispersion 1B comprising hydroplasticisable first polymer and polymerised. This implies that in the second polymerisation step the first stage polymer is not yet hydroplasticed, i.e. not neutralised before the second stage polymerisation. The pH during the second stage polymerisation therefore is low; typically below 7, preferably less than 6.5, more preferably less than 6. The vinyl polymer dispersion can be but does not need to be hydroplasticized by the addition of base at the end of the polymerization process. After neutralisation step 3 the pH is 7 to 10, preferably 7-9. One advantage of the invention is that it allows to formulate the aqueous dispersion to a coating composition by mixing in coating additives at lower viscosity before hydroplasticising. A further advantage of the coating composition that has not been (fully) neutralised and has a pH of below 8, 7.5 or even below 7 is that it can advantageously be used on substrates that are sensitive to high pH, as for example certain wood substrates.

Typically, in the polymerization step (2b) the multiphase particles in the multiphase particle dispersion (2B) have an average particle size of less than 80 nm and preferably a transparency value of at least 35 at a solids content of at least 35 wt %. The transparency value being defined as measured using a LICO 200 as described in more detail below. The solids content here and hereafter (unless specified differently) is the dry non/volatile weight of the polymer components specified above as determined by ISO 3251.

It is noted that EP338486 and U.S. Pat. No. 4,894,397 (Morgan et al.) describes an emulsion polymerization process in which in the first stage a hydrophilic low molecular weight polymer is made and in which in the second stage a hydrophobic second polymer is formed into the first stage polymer followed by addition of a base thus producing an inverted core-shell emulsion. However, the document is silent about obtaining good film forming properties while preserving good coating properties. Further, it is not described how to achieve good particle size control and the polymer dispersions obtained have a low solids content and-or a lack of transparency. The comparative examples show that the process according to Morgan results in polymer dispersions having a significantly larger particle size than the dispersions of the invention, resulting in a lower in can clarity and poorer film forming properties.

DETAILED DESCRIPTION OF THE INVENTION

In the first polymerization step the monomer mixture (1a1), the specified sulfur based anionic surfactant (1a2) and preferably also an initiator are mixed in water to prepare an emulsion (1A) wherein the water soluble inorganic salt (1a3) is present in a specified low amount (1a1). In principle the components in the emulsion 1A can be mixed in any several different orders as known in the art before polymerization step 1b. The monomers in the monomer mixture can be provided premixed or separately, continuous or in one or more portions, before during or after charging water, surfactant, initiator and before, during or after heating to the reaction temperature.

In a preferred embodiment however, an emulsion polymerization reactor is charged with water and a sulfur based anionic surfactant. The pre-charge of water and surfactant is heated to the reaction temperature. Emulsion polymerization reactions can be carried out over a wide temperature range; for example between 50 and 120° C., preferably between 60 and 100° C., but in order to have a sufficiently fast conversion of monomer to polymer a temperature between 70 and 95° C. is preferably selected when the reaction is carried out under atmospheric pressure. A free radical initiator is normally added to the reactor to start the polymerization, preferably when the contents of the reactor have reached the desired reaction temperature. These general polymerization conditions apply to the first and second polymerization step Suitable sulfur based surfactants (1a2) include, but are not limited to the salts of alkylethoxylate sulfates and sulfonates, alkylphenolethoxylate sulfates and sulfonates, alkylsulfates and sulfonates, alkylaryl sulfonates, sulfosuccinates, and mixtures thereof. Besides the conventional types of surfactants also sulfur-based surfactants containing ethylene oxide in an amount less than 60 wt %, preferably less than 50 and more preferably less than 40 wt % and more than 5 wt % (wt % relative to total surfactant weight) and preferably having an ethylenically unsaturated bond that can participate in a free radical polymerization (so-called reactive surfactants). These surfactants can be used either as sole-emulsifier or in combination with conventional surfactants. The amount of surfactant preferably is below 5, more preferably below 3 and most preferably below 2 weight % relative to the total amount of first stage monomers (1a1).

At the start of the first polymerization step (1b) the total water soluble inorganic salt concentration should be less than 3 grams per 1000 grams water in the reactor, more preferably less than 2.5, more preferably less than 2.0 and most preferably less than 1.5 g/kg water. It was found that a low amount of water soluble inorganic salts in combination with the specified sulfur based anionic surfactant is essential in achieving a low particle size in the first polymerisation step. Water soluble inorganic salts include salts present in the water that is used, salts that are present as impurities in the surfactant that is used (but not include the organic surfactant salts themselves), the salts of the free radical initiation system or buffer salts. What is relevant is the total inorganic salt content that is present in the reaction system at the onset of nucleation of the polymerisation reaction, so if the monomers are added as pre-emulsified monomer emulsion which contains water-soluble inorganic salts these salts are also relevant and should be included. Inorganic salt is defined in this context as a chemical compound consisting of an assembly of cations and anions excluding colloidal electrolytes as defined in IUPAC Compendium of Chemical Terminology, 2nd ed. (the "Gold Book" compiled by A. D. McNaught and A. Wilkinson, Blackwell Scientific Publications, Oxford (1997), ISBN 0-9678550-9-8. doi:10.1351/goldbook). Organic salts (colloidal electrolytes) such as ionic or cationic surfactants are excluded as these contain an organic moiety and form micelles.

Examples of water soluble inorganic salts in the context of the application therefore are: sodium chloride (NaCl), Sodium sulfate ($Na_2SO_4$), both can be present as impurities in sulfated surfactants, ammonium persulfate (($NH_4$)$_2S_2O_8$), potassium persulfate ($K_2S_2O_8$), sodium persulfate ($Na_2S_2O_8$), sodium bisulfate ($NaHSO_3$), sodium hydrosulfite ($Na_2S_2O_4$), these salts can be part of a free radical initiation system. In the calculation of the amount of water soluble inorganic salt, the active ionic matter from the surfactant is not included but the amount does include inorganic salts contained in the surfactant as supplied, inorganic salt present in the water used, the free radical initiator and any other inorganic salts added to the initial charge. The maximum inorganic salt concentration can be calculated from the specification of the raw materials used provided by the supplier. Preferably the water used in preparing the aqueous polymer dispersion has a low water soluble inorganic salt content. Therefore preferably the water is de-ionised or demineralized water having a conductivity below 20 μS/m according to ISO 5687. Commonly used methods to determine water soluble inorganic salt concentrations in aqueous solution include conductivity measurements or the use of ion-selective electrodes. The maximum salt concentration requirement can for example be determined with electrical conductivity by using a pre-prepared calibration curve of the conductivity the of varying amounts of salts in the mixture.

The monomer mixture (1a1) preferably comprises and more preferably consists of 1-45, preferably 2.5-40, more preferably 5-35, most preferably 7.5-30 weight % of carboxylic acid functional monomers, 0-20, preferably 1-15, more preferably 3-10, most preferably 5-10 weight % of cross linking monomers other than those mentioned in i), 98.5-50 preferably 90-50, more preferably 85-60, most preferably 80-70 weight % of vinyl monomers other than those mentioned in i) and ii) and optionally chain transfer agents. The weight percentages are relative to the total weight of monomers in the first monomer mixture). The amount of acid functional monomers introduced in the first monomer mixture 1a1 is such that the acid value of the resulting first polymer will be more than 23 mg KOH/g, preferably more than 35 mg KOH/g, more preferably more than 45 mg KOH/g and most preferably more than 55 mg KOH/g. Preferably the acid value is below 150, more preferably below 125 and good results can also be obtained at acid values below 100 or below 75 mg KOH/g. Acid values are given for the solid polymer and are calculated from the monomer composition. A copolymer obtained by the polymerization of a monomer mixture consisting of 50 parts of methyl methacrylate, 40 parts of butyl acrylate and 10 parts of methacrylic acid will have 0.001161 moles of carboxylic acid per gram solid polymer. Multiplying this value with 56,100 will give the acid value expressed in mg KOH/gram solid polymer, so in this case 65.2 mg KOH/g. Acid value can also be determined experimentally according to DIN EN ISO 2114.

The monomers can be fed neat or emulsified using additional water and surfactant. Care should be taken that the pH of the polymerization system remains acidic during the first stage polymerization, preferably below a value of 6. The first stage polymer is composed of ethylenically unsaturated monomers, preferably esters of acrylic and methacrylic acid such as n-butyl(meth)acrylate, methyl(meth)acrylate, ethyl (meth)acrylate, 2-ethylhexyl(meth)acrylate, cycloalkyl (meth)acrylates, e.g., isobornyl(meth)acrylate and cyclohexyl(meth)acrylate, or an ethylenically unsaturated compound such as styrene, e.g., normal styrene or substituted styrenes, for instance α-methyl styrene or t-butyl styrene; vinyl toluene; dienes such as 1,3-butadiene or isoprene, or mixtures thereof. Also vinyl esters, such as vinyl acetate, vinyl alkanoate or their derivatives or mixtures thereof can be used in the monomer composition. Nitriles, such as (meth) acrylonitrile can also be used.

The monomer composition also contains unsaturated monomers with carboxylic functionality. Optionally, the acid groups are latent as, for example, in maleic anhydride, where the acid functionality is present in the form of an anhydride group. Preferably, monomers such as (meth)acrylic acid are used. Other possible carboxylic acid-functional monomers are itaconic acid, fumaric acid maleic acid, citraconic acid, or the anhydrides thereof. Besides monomers having carboxylic acid functionality also monomers possessing a further acid-functional group other than the carboxylic one can be present in the monomer composition, such as ethylmethacrylate-2-sulfonic acid or 2-acrylamido-2-methylpropane sulfonic acid.

Other monomers possessing a further functional group other than the acidic one can also be present in the monomer composition. Examples of such monomers are hydroxy-functional monomers such as hydroxyethyl(meth)acrylate, hydroxypropyl(meth)acrylate, hydroxybutyl(meth)acrylate, derivatives of (meth)acrylamide such as N-methylol(meth) acrylamide and diacetone acrylamide. Also the adducts of hydroxy-functional monomers with ethylene or propylene oxide can be present in the monomer composition. Vinyl monomers possessing an acetoacetoxy functional group can also be present in the monomer composition. Examples of such vinyl monomers are acetoacetoxyethyl methacrylate, acetoacetoxyethyl acrylate, acetoacetoxy(methyl)ethyl acrylate, acetoacetoxypropyl acrylate, allyl acetoacetate, acetoacetamidoethyl(meth)acrylate, and acetoacetoxybutyl acrylate. Preferably, the first stage polymer is a copolymer of (meth) acrylic acid, and other (co)monomers, e.g., (meth)acrylic esters and/or (meth)acrylamide derivates. Preferably, the first stage polymer contains carbonyl-functional groups. As a result, covalent cross-linking will take place with the hydrophilic first polymer as well as with the water-insoluble polymer. Preferably, the carbonyl-functional groups are introduced into the hydrophilic first polymer by diacetone acrylamide.

A distinct advantage of the process according to the invention over prior art methods using water-soluble first stage polymers is that the number averaged molecular weight (as determined by gel permeation chromatography; GPC) of the first stage polymer can be relatively high. The prior art process may use first stage polymers having molecular weight up to 10000, but viscosity problems already manifest at significantly lower molecular weight for example above 7000 g/mol. The number average molecular weight of the first stage polymer 1B generally can be between 750 and 100000, preferably between 2500 and 75000 and most preferably between 5000 and 75000 g/mol. The invention permits to use higher molecular weights that are useful for some applications, in particular more than 7000, 8000, 9000, 10000 or even 20000 g/mol. One noticeable advantage is that the interaction of a dispersion with a high molecular weight first polymer with associative thickeners is improved Methods to influence the molecular weight in emulsion polymerization to achieve the desired number average molecular weight are well known to those skilled in the art and are described for example in "Emulsion Polymerization, A Mechanistic Approach" by Bob Gilbert, 245-291, Academic Press, 1995.

In a preferred embodiment a chain transfer agent is used to reduce the molecular weight in the polymerisation. Exemplary chain transfer agents are butyl mercaptan, mercaptopropionic acid, 2-ethylhexyl mercaptopropionate, n-dodecylmercaptan, t-dodecylmercaptan, n-butyl mercaptopropionate, mercaptoethanol, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate. Other, non sulfur based chain transfer agent include halogenated hydrocarbons or catalytic chain transfer agents such as Cobalt-chelates such as used in N. S. Enikolopyan et al, J. Polym. Chem. Ed, Vol 19, 879 (1981). Also alpha-methyl styrene dimer or oligomers of alpha-methyl styrene dimer can be used as explained in US 2007/0043156 A1 and U.S. Pat. No. 6,872,789. Yet another method to synthesize polymer with a well defined molecular weight is the use of diarylethene. The use of diarylethene is described in detail in W. Bremser et al, Prog. Org. Coatings, 45, (2002), 95 and JP 3135151, DE 10029802 and US 2002/0013414. A commonly used diarylethene includes diphenylethene.

A significant improvement in film formation properties can be achieved because the first stage dispersion contains a polymer with a high glass transition temperature (Tg). This polymer can be plasticized by water by adjusting the pH of the polymer dispersion after the polymerization of the second stage polymer The neutralization of the acid groups contained in the first stage polymer will cause it to become partially or wholly solubilized by the aqueous phase, causing a significant reduction of the minimal film-formation temperature of the final polymer dispersion. Upon the evaporation of the water and the neutralizing base from the coating the plasticization by water of the hard polymer is reduced and the properties corresponding to a high Tg polymer appear. The Tg of the first stage polymer should be in the range from 10 to 125° C., more preferably 20 to 125° C., more preferably 30 to 125° C., even more preferably 50 to 125° C.; for certain applications even 70 to 125° C. is preferred. The Tg of the second stage polymer should be at least 25° C., more preferably at least 40° C. below the Tg of the first stage polymer. Usually, the Tg of the second stage polymer will be within the range of from −50° C. to 50° C., more usually from −25° C. to 40° C. The Tg can be calculated from the Fox equation (T. G. Fox, Bull. Am. Phys. Soc. 1 (1956), 123): represented by the formula: $1/Tg = W1/Tg(1) + W2/Tg(2) + W3/Tg(3) + \ldots$ wherein W1, W2, W3, etcetera, are the weight fractions of the comonomers (1), (2), and (3), (etcetera), and Tg(1), Tg(2), Tg(3) mean the glass transition temperatures of their respective homopolymers. A list of glass transition temperatures of homopolymers is given below.

TABLE I

Glass transition temperatures for homopolymers of selected monomers.

| Monomer | Tg of homopolymer (Kelvin) |
|---|---|
| Acrylic acid | 379 |
| Methyl acrylate | 283 |
| Ethyl acrylate | 249 |
| Butyl acrylate | 219 |
| iso-Butyl acrylate | 249 |
| 2-Hydroxy ethylacrylate | 258 |
| 2-Hydroxy propylacrylate | 266 |
| Methacrylic acid | 501 |
| Methyl methacrylate | 378 |
| Ethyl methacrylate | 338 |
| Butyl methacrylate | 293 |
| iso-Butyl methacrylate | 326 |
| 2-Hydroxy ethylmethacrylate | 328 |
| 2-Hydroxy propylmethacrylate | 349 |
| Iso-bornylacrylate | 367 |
| Styrene | 373 |
| Acrylonitrile | 370 |
| 2-Ethylhexylacrylate | 205 |
| Acrylamide | 438 |
| Diacetonacrylamide | 350 |

For monomers not listed in the table above Tg values as published in the Encyclopedia Of Polymer Science and Technology, 4th Edition (Wiley Online ISBN: 9780471440260) can be used. The range of minimum film forming temperature MFT for the compositions will usually be about 0 to 55° C., more preferably 0 to 30° C.

The particle size (measured as the Z average mean using dynamic light scattering) of the polymer dispersion 1B obtained in the first stage polymerization step is preferably below 80 nm, more preferably below 70 nm, even more preferably below 60 nm and in good conditions typically below 50 nm, preferably between 30 and 45 nm. After completion of the first monomer feed and allowing sufficient time to allow the conversion of the monomers to become sufficiently high; preferably at least 80 or 90%, a second monomer mixture (2a1) can be added to the first polymer dispersion 1B. The monomers for this second monomer mixture can be selected from the same group as for monomer mixture 1a1 used for the first stage polymer with the proviso that if acid functional monomers are introduced in the second stage monomer mixture the acid value of the resulting polymer will be less than 23 mg KOH/g, preferably less than 20, more preferably less than 17, even more preferably less than 15 and most preferably at most 10 mg KOH/g.

The second stage monomer mixture may also comprise multi-functional ethylenically unsaturated monomers (2a2) in an amount preferably up to about 2 weight percent, based on total monomer content, to provide pre-crosslinking or to increase the molecular weight of the second stage polymer. Useful pre-crosslinkers include trimethylolpropane tri(meth) acrylate, 1,6-hexanediol di(meth)acrylate, allyl methacrylate, divinyl benzene and the like.

The second stage monomer mixture (2a1) can be added neat or pre-emulsified using additional water and surfactant. Before the start of the second polymerisation the pH is not adjusted or only a little to such extent that the first polymer is not neutralised and solubilised and the particles remain particles with a measurable particle size, preferably the pH at the start of the second polymerisation is below 7, preferably below 6. Care should be taken that the pH of the polymerization system remains acidic (pH <7) also during the second stage polymerization, preferably below a value of 6. The mixture can be continuously fed to the reactor or can be added in several portions. Alternatively the second stage monomer mixture can be divided into two fractions of different composition and an addition scheme can be used that will result in a heterogeneous or gradient morphology. The ratio between the amount of first stage polymer and second stage polymer can in principle vary in wide ranges, but is preferably chosen between 20 and 80 wt %, more preferably between 30 and 70 wt % and most preferably between 40 and 60 wt % (amount of first monomer mixture relative to the total amount of the first and second monomer mixture).

The second stage monomer composition can either be polymerized by a thermal initiation system such as an alkali persulate such as sodium, potassium or ammonium persulfate like for the first stage monomer composition or by a redox initiation system. Typical initiators in redox systems include hydrogen peroxide, dibenzoyl peroxide, lauryl peroxide, di-tertiary butyl peroxide, t-butyl hydroperoxide, benzoyl peroxide, and the like.

Suitable reducing agents are those which facilitate radical formation from the initiator and include for example, sodium bisulfite, sodium hydrosulfite, sodium formaldehyde sulfoxylate, disodium 2-hydroxy-2-sulfinic acetic acid, ascorbic acid, isoascorbic acid and mixtures thereof.

Polymerization catalysts are those compounds which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

A particular advantage of the process of the present invention is that it provides very good control of the particle size of the vinyl polymer dispersions. This results in a very good transparency (and in-can-clarity ICC) even at higher solids contents. In view of obtaining a good ICC the particle size of the dispersion 2B is preferably less than 100 nm, but more preferably less than 80 nm, even more preferably less than 75 and most preferably less than 70 nm. Strict care has to be taken that the lowest possible fraction of larger particles is present in the dispersion as even small amounts of larger particles will have a deleterious effect on ICC. Therefore, the vinyl polymer dispersion preferably has less than 20 wt %, more preferably less than 15 wt % and most preferably less than 10 wt % of particles having a particle size above 100 nm or preferably even above 80 nm.

Once the second stage monomer composition has been polymerized, the vinyl polymer dispersion 2B can be finished by cooling. The obtained aqueous dispersion is hydroplasticisable. In a preferred embodiment of the process according to the invention, the process further comprises a step (3) comprising hydroplasticising the multiphase particle dispersion (2B) by addition of base, preferably a volatile base, to a pH between 6.5 and 9, more preferably between 6.5 and 8 or 6.5 and 7.5.

Preferably, the volatile base is ammonia. Other possible bases are, for example, volatile amines, such as amino methyl propanol, dimethyl ethanolamine or 2-dimethylamino-2-methyl-1-propanol, triethyl amine or mono-ethanol amine. Optionally, a blend of different volatile bases can be used.

Optionally the hydroplasticising addition of the neutralizing base can be postponed until the polymer dispersion is formulated into a coating composition. Therefore, in another embodiment of the process according to the invention, a coating composition is prepared in a process wherein the hydroplasticisable dispersion 2B is formulated to a coating composition by addition of one or more coating additives before or during the abovementioned hydroplasticising step (3). The term coating additives is meant broadly here and includes co-binder polymers, crosslinking agents, pigments, fillers, rheology and stability improvers as used in the art to formulate a coating composition for a specific application. The advantage is that before the hydroplasticising the viscosity of the dispersion is significantly lower and coating additives can be homogeneously mixed in more easily.

The process may further comprising a step (4) comprising adding a separate crosslinking agent for reaction with crosslinking monomers in monomer mixtures (1a1) or (2a1) or with unsaturated groups (2a2). The crosslinking agent can in principle be added at any stage of the process where it does not chemically interfere, but is preferably added after process step 2, more preferably after step 3.

The selection of the crosslinking agent that can be added to the polymer dispersion and that can react with the functional group of the polymer derived from the cross-linking monomers in both the first and (optionally) second stage polymer, depends on the chemical nature of this group. This compound can be either a polymeric or a low-molecular weight compound. In order to effect cross-linking, the cross-linking compound must possess at least two reactive groups. Examples of suitable co-reactive groups for given pendant functional groups are known to those skilled in the art. Non-limiting examples are given in Table II.

TABLE II

| Pendant functional group | Co-reactive groups |
| --- | --- |
| Amine | Oxirane, isocyanate, ketone, aldehyde, acetoacetoxy |
| Hydroxy | Methylol, etherified methylol, isocyanate, aldehyde |
| Ketone | Amino, hydrazide, aldehyde |
| Acetoacetoxy, acetoacetamide | Amino, isocyanate, aldehyde, metal-ion, hydrazide |
| Aldehyde | Amino, hydrazide |
| Urea | Glyoxal |
| Oxirane | Carboxylic acid, amino, thiol |
| Carboxyl | Aziridine, oxirane, carbodiimide, metal-ion |

When the cross linking monomer used has ketone or acetoacetoxy functionality, the preferred cross linkers are acid dihydrazides such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, phthalic acid dihydrazide, or terephthalic acid dihydrazide. Alternatively, the cross-linking agent can be a water-soluble aliphatic dihydrazine, such as ethylene-1,2-dihydrazine, propylene-1,3-dihydrazine, and butylene-1,4-dihydrazine, or a polyamine such as isophorone diamine or 4,7-dioxadecane-1,10-diamine. Most preferred are adipic dihydrazides or a ketone-blocked adipic dihydrazides. Other suitable crosslinkers when crosslinking monomers with functionality other than ketone or acetoxy are used include but are not limited to alkylated ureum or melamine formaldehyde resins, (blocked) polyisocyanates, epoxy-silanes, carbodiimides, polyazeridines and the like.

The hydroplasticizable vinyl polymer dispersion 2B of the present invention can be utilized in a coating composition alone or in conjunction with other waterborne polymers. The process of the invention may further comprise step (5) comprising adding to the hydroplasticizable vinyl polymer dispersion 2B before, during or after hydroplasticization another aqueous polymer, preferably as an aqueous polymer dispersion. Such polymers include, but are not limited to, water dispersible polymers such as consisting of polyesters, polyester-amides, cellulose esters, oxidatively drying alkyds, polyurethanes, epoxy resins, polyamides, acrylics, vinyl polymers, polymers having pendant allyl groups, styrene-butadiene polymers, vinylacetate ethylene copolymers, and the like. Such polymers may also be made according to the invention or contain a heterogeneous or gradient morphology. If other polymer (co-binder) is used the amount is depending on the envisaged application preferably between 1 and 50 wt %, preferably between 5 and 40 wt %, more preferably between 5 and 35 wt % (relative to total of first and second stage polymer and co-binder).

The invention also relates to a multiphase vinyl polymer particle dispersion obtainable according to the method of the invention, either in the neutralised form comprising neutralised hydroplasticized first stage polymer and having a pH between 7 and 10, preferably between 7 and 9 or not-neutralised comprising hydroplasticisable first stage polymer and having a pH between 4 and 7. The invention also relates to a coating composition comprising the multiphase vinyl polymer particle dispersion according to the invention and one or more further coating additives. The process of the invention has the advantage that a coating composition can be prepared in a different process wherein the hydroplasticisable dispersion 2B is formulated to a coating composition by addition of coating additives before or during the hydroplasticising step (3). Another advantage is that the multiphase vinyl polymer particle dispersion can be used for the manufacture of a coating composition having a pH between 4 and 8, which has particular advantages for substrates that are sensitive to a high pH, for example wood that turns dark on exposure to a base.

A waterborne coating composition according to the invention may comprise the hydroplasticized vinyl polymer dispersion of the invention utilized alone or in conjunction with another waterborne polymer(s) and water, along with an organic solvent, a pigment (organic or inorganic) and/or other additives and fillers known in the art. When an organic solvent is used, water miscible solvents are preferred. Additives or fillers used in formulating coatings include, but are not limited to, leveling, rheology, anti-block, and flow control agents such as silicones, fluorocarbons, urethanes, or cellulosics; extenders; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; or coalescing agents.

Upon formulation, a coating formulation containing the hydro-plasticized polymer dispersion of the invention may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art, for example by spraying, dipping, brushing, rolling, flexo printing, gravure printing, ink-jet printing, any other graphic arts application methods and the like.

In general, the coating may be dried by heating but preferably is allowed to air dry. Crosslinking of the coating employing a polymer of the invention may be thermally or at ambient temperature. As a further aspect, the present invention relates to a shaped or formed article which has been coated with a coating formulation of the present invention.

The following examples are intended to illustrate the process for preparation of hydroplasticizable and hydroplasticized vinyl polymer dispersions according to the invention, the products obtained and the application thereof and is not intended to limit the invention.

Test Methods
Transparency Value of a Polymer Dispersion

The clarity of a polymer dispersion was determined by measuring the transparency of the dispersion using a LICO 200 spectrophotometer (HACH LANGE). The LICO 200 spectrophotometer measures the transmittance of samples within the range 380-720 nm with the application of standard light C (as defined in DIN standard 5033). The transmittance (T) is the ratio I/Io of the intensity of the light emerging from the sample over the intensity of the incident radiation (Io). The transmittance can be expressed as a transparency value $dL=T*100$. where $dL=100$ is clear and $dL=0$ is opaque. The spectrophotometer uses a 11 millimeter round sample cuvette.

Molecular Weight Determination

The molecular weight and molecular weight distribution was determined using size exclusion chromatography. The size-exclusion apparatus used is an Alliance system consisting of a pump, autosampler and He-degasser (Degasys DG-1210 from Uniflows), equipped with a PLgel 5 μm MIXED-C 600×7.5 mm Column and a Plgel 5 μm guard column (50×7.5 mm—Polymer Laboratories). The Column oven (Separations Analytical Instruments) was set at 30° C. Tetrahydrofuran (THF—Extra Dry, Biosolve 206347)+2% acetic acid (Baker 6052) is used as eluent at a flow-rate of 0.8 ml/min. Carbon disulfide (Backer) is used as a marker. A Waters 410 refractive index is used as detector. The injection Volume is 100 μl at a concentration of 1.5 mg/ml. Polystyrene standards (Polymer Laboratories, Easical PS-1, 2010-0501 (M range 580 g/mol-8.500.000 g/mol) en Easical PS-2, 2010-0601 (M range 580 g/mol-400.000 g/mol)) were used for calibration using a third order polynomial. Software used for data-analysis is Empower (Waters).

Determination of MFT

The MFT was determined by using a Rhopoint MFT-Bar 60 which has a temperature range from 0° C. to 60° C. Films were applied with a wet film thickness of 25 microns. The MFT was the lowest temperature at which the film showed no cracks.

Determination of Particle Size

Particle size was determined by dynamic light scattering using a Malvern Zetasizer model Nano-S90. The Z-average value was reported as the particle size. The z-average diameter is the mean hydrodynamic diameter and is calculated according to the International Standard on dynamic light scattering ISO13321.

Determination of pH

The pH was measured using a Proline QIS pH meter.

Determination of Brookfield Viscosity

Brookfield viscosity is measured with a Brookfield RVT viscometer at a temperature of 23±1° C., according to ISO 2555-1974.

Definition of Terms in the Examples:

The polymer solids of the 1st stage is the sum of the monomers and chain transfer agents used. The total polymer solids is the sum of the 1st stage polymer solids and the 2nd stage polymer solids. The water-soluble inorganic salt concentration in the first stage is the weight of water-soluble inorganic salts relative to the aqueous phase of the first stage. The surfactant concentration is the weight of surfactant relative to the total polymer solids. Amounts of water added may vary between experiments.

Raw Materials Used in the Examples:

Sodium lauryl sulfate: Texapon K 12 G from Cognis containing not more than 2.5% of sodium sulfate and 1% of sodium chloride as specified by the manufacturer.

Demineralized water: produced by ion-exchange or reverse osmosis having a conductivity below 20 μS/m according to ISO 5687 corresponding with a maximum salt content of 0.018%.

Ammonium persulfate was supplied by Caldic and has a minimum purity of 99%.

EXAMPLE 1

A 3 liter reactor was charged with 968.3 grams of deionized water and 7.1 grams of sodium lauryl sulfate. The reactor contents were heated to 83° C. while creating a nitrogen atmosphere in the reactor. The nitrogen atmosphere was maintained throughout the whole polymerization process. When the reactor reached 83° C., a solution of 1.1 grams ammonium persulfate dissolved in 15.0 grams deionized water was added to the reactor to initiate the first polymerisation reaction. The salt concentration of the pre-charge as calculated from the specifications of the raw materials was below 1.6 g/kg (1.1 gr ammonium persulfate plus 0.25 gr (maximum 3.5% soluble salt impurity) in the 7.1 plus 1.6 grams of sodium lauryl sulfate and maximum 0.174 gr in the water). Immediately after that, the first monomer feed was fed into the reactor in 1 hour. The first monomer feed was a pre-emulsified feed consisting of 194.6 grams deionized water, 1.6 grams sodium lauryl sulfate, 5.7 grams of n-dodecyl mercaptan, 2.9 grams 3-mercapto propionic acid, 22.2 grams diacetone acrylamide, 44.4 grams methacrylic acid, 288.5 grams methyl methacrylate and 88.8 grams n-butyl methacrylate. When the first monomer feed was finished the feed tank was rinsed with 19.6 grams of deionized water. The rinse water was added to the batch. After the rinse the batch was kept at 83° C. for another 15 minutes before cooling to 70° C. At this point a sample was taken for particle size and molecular weight analysis. The particle size (PS1) of the sample was 32 nm. The number average molecular weight (Mn) was 7700.

While the batch was cooling to 70° C., a mixture of 1.9 grams of t-butyl hydroperoxide (70%) and 4.6 grams of deionized water was added to the batch and 1.0 grams of a solution containing 0.065 grams Iron (II) sulfate heptahydrate and 0.079 grams ethylenediamine-tetra-acetic acid disodium salt dehydrate per 100 grams solution. When the batch reached 70° C., the reducer feed and the second monomer feed were started. The reducer feed contained 111.3 grams deionized water, 1.1 grams iso-ascorbic acid and 1.1 grams ammonia (25% to neutralize the iso-ascorbic acid. The second monomer feed consisted of 332.9 grams methyl methacrylate and 111.0 grams n-butyl acrylate. The second monomer feed was fed into the reactor in 1½ hours, the reducer feed was fed into the reactor in 2 hours. At the end of the second monomer feed the feed tank was rinsed with 19.6 grams of deionized water. The rinse water was added to the batch. When the second monomer feed was finished the temperature of the batch was gradually reduced to 60° C. while the reducer feed was still running. About 20 minutes after the reducer feed was completed a sample was taken for particle size analysis. The particle size after the second polymerization step (PS2) was 45 nm. The batch was then cooled to room temperature. During the cooling process 20.93 grams ammonia (25% strength) were added to the batch to neutralise and hydroplastisize the acid groups in the polymers. At room temperature 11.5 grams adipic dihydrazide crosslinking agent was added to the batch followed by 23.5 grams of deionized water. The final product after hydroplasticising had a pH of 7.6, a particle size (PSF) of 63 nm, a dL-value of 45.4, a solids content (SC) of 39.9 wt % and a Brookfield viscosity (BV) of 65 mPa·s. The measured product properties are summarized in Table 1.

TABLE 1

|  | PS1 | Mn1 | PS2 | pH | PSF | dL | SC | BV |
|---|---|---|---|---|---|---|---|---|
| Ex1 | 32 | 7700 | 45 | 7.6 | 63 | 45.4 | 39.9 | 65 |
| CE2 | 42 | 7600 | 68 | 7.5 | 75 | 30.5 | 39.9 | 28 |
| EX3 | 35 | 12400 | 50 | 8.4 | 58 | 55 | 37.3 | — |
| EX4 | 48 | 12400 | 60 | 8.6 | 67 | 39 | 37.5 | — |
| CEX5 | * | 12100 | * |  |  |  |  |  |
| EX7 | 21 | — | — | 8.8 | 64 | 61 | 40 | 425 |

—: not measured
*: no particles formed; gel formed in second stage

COMPARATIVE EXPERIMENT 2

An aqueous composition was prepared in a process as described in example 1 except that 3.3 (iso 1.1) grams ammonium persulfate were used in the pre-charge resulting in a salt concentration higher than 3 g/kg. The measured product properties are summarized in Table 1. The comparative example shows that the process according to the invention results in a dispersion having a significantly lower particle size than the dispersions according to prior art process (Morgan).

EXAMPLE 3

An aqueous composition was prepared in a process as described in example 1 except that 4.0 (iso 7.1) grams of sodium lauryl sulfate and 1.8 (iso 1.1) grams ammonium persulfate were used in the pre-charge resulting in a salt-concentration below 2.3 g/kg. For the pre-emulsified feed 4.9 (iso 1.6) grams sodium lauryl sulfate and 3.6 (iso 5.7) grams of n-dodecyl mercaptan were used. The measured product properties are summarized in Table 1.

EXAMPLE 4

An aqueous composition was prepared in a process as described in example 1 except that for the pre-charge 2.0 (Iso 1.1) grams ammonium persulfate and 6.2 (iso 1.2) grams sodium lauryl sulfate were used, resulting in a salt concentration below 2.7 g/kg. In the pre-emulsified feed, 3.6 (Iso 5.7) grams of n-dodecyl mercaptan, and no 3-mercaptopropionic acid were used. To 400 gr of the final product 2.0 grams adipic dihydrazide in 24.7 grams of deionized water was added. The measured product properties are summarized in Table 1.

COMPARATIVE EXPERIMENT 5 (According to EP 0758364; Overbeek)

An aqueous composition was prepared in a process as described in example 4. A solution of 34.3 grams ammonia (25%) in 24.0 grams deionized water was added thisge polymer dispersion to neutralize and solubilize the polymer. About 3 min. after ammonia was added for, the batch became extremely viscous and an additional 328.0 grams of water had to be added to the batch in order to be able to continue stirring. Upon the addition of the second stage monomer mixture consisting of 167.2 grams of methyl methacrylate and 55.7 grams of butyl acrylate, the contents of the reactor turned into a firm gel. The comparative example shows that in the process of the invention, compared to the prior art process a higher molecular weight in the first polymerisation step can be used without gel formation in the second polymerisation step.

EXAMPLE 6

A paint formula was prepared by mixing the components presented in table 2. Example 6A is based on the dispersion from Example 1 (low Mn1) and Example 6B is based on the dispersion from Example 4 (high Mn1)

TABLE 2

| Component | Example 6A (grams) | Example 6B (grams) |
| --- | --- | --- |
| Dispersion from example 1 | 188.0 | — |
| Dispersion from example 4 | — | 200.0 |
| Demineralized water | 22.9 | 10.9 |
| Dowanol DPM (Dipropylene Glycol Methyl Ether ex. Dow Chemicals) | 10.6 | 10.6 |
| Dehydran 1293 (defoamer ex. Cognis) | 0.8 | 0.8 |
| Surfynol 104 DPM (wetting agent ex. Air Products and Chemicals, Inc) | 0.8 | 0.8 |
| Tego Visco Plus 3060 (associative thickener ex. Evonik) | 3.1 | 3.1 |
| Total | 226.2 | 226.2 |

The viscosity of the formulas was recorded over time. Table 3 presents the viscosities of the formulas of examples 6A and 6B.

TABLE 3

| Time (days) | Viscosity example 6A (mPa·s) | Viscosity example 6B (mPa·s) |
| --- | --- | --- |
| 0 | 195 | 620 |
| 1 | 370 | 1100 |
| 7 | 610 | 3800 |

As the results in table 3 indicate, the dispersion from example 1 (coating 6A) clearly had, compared to the dispersion from example 4 (coating 6B), a lower increase in viscosity over time in the presence of the same amount of the associative thickener (Tego Visco Plus 3060). This implies that in the formulation 6B a lower amount of associative thickener is needed to achieve an appropriate application viscosity. This is not only more economic but also is advantageous in terms of the resulting coating properties. This demonstrates one of the benefits of being able to make a higher molecular weight hydro-plasticizable polymer in the first polymerisation stage.

EXAMPLE 7

An aqueous composition was prepared in a process as described in example 1 except using 947.2 grams of deionized water and 3.73 grams of sodium lauryl sulfate and 1.87 grams ammonium persulfate resulting in a inorganic salt concentration below 2.3 g/kg. The pre-emulsified first monomer feed composition given in table 4 (in grams) was fed into the reactor in 1 hour.

TABLE 4

| | |
| --- | --- |
| Demineralized water | 147.4 |
| Sodium lauryl sulfate | 2.2 |
| Diacetone acrylamide | 43.6 |
| Methacrylic acid | 26.1 |
| Methyl methacrylate | 300.5 |
| Butyl methacrylate | 65.3 |
| Octyl mercaptan | 4.5 |

The pH of the batch was measured to be 3.1. The particle size of the sample was 21 nm and the transparency value dL was 71. The composition of the second monomer feed is given in table 5.

TABLE 5

| | |
| --- | --- |
| Methyl methacrylate | 126.4 |
| n-Butyl acrylate | 304.9 |
| Styrene | 15.9 |
| Divinyl benzene | 6.8 |

During the cooling process ammonia was added to neutralized. At room temperature 11.71 grams adipic dihydrazide was added to the batch followed by 23.46 grams of deionized water. The final product properties are summarized in Table 1.

EXAMPLE 8

Coating Evaluation

A clear varnish was formulated by blending the components given in table 6 using a high speed dissolver.

TABLE 6

| | weight |
| --- | --- |
| Polymer dispersion from example 7 | 171.4 |
| Butyl diglycol | 6.9 |
| Premixted Tego foamex 800/Demineralized water 1:1 parts | 1.1 |
| Surfynol 104 DPM (wetting agent ex. Air Products and Chemicals, Inc) | 1 |
| Pre-mixed solution of Byk 333 (ex. Byk Chemie)/Demineralized water 1:3 parts | 2.2 |
| Demineralized water | 8.6 |
| Premixed thickener solution Borchigel L75N (thickener ex. Borchers)/Dowanol PnP (coalescing agent ex. Dow Chemical) 1:2 parts | 1.9 |
| Acticide MBS (biocide ex. Thor Specialities) | 0.4 |
| Demineralized water | 3.2 |

The formulated varnish has a clarity of 42. The varnish was applied onto a glass plate at a wet layer thickness of 150 micron and dried at ambient temperature. The König hardness was measured according to DIN 52157. The development of hardness as a function of temperature is given below:

| Drying time (days) | König hardness (s) |
| --- | --- |
| 1 | 43 |
| 7 | 92 |
| 14 | 100 |
| 21 | 110 |

Chemical resistance properties were tested according to DIN 68861-1B. Results are given below:

| | |
|---|---|
| Acetone | 3 |
| Ethanol (50% aqueous) | 4 |
| Ammonia (25%) | 4 |
| Black Ink | 3 |
| Coffee | 5 |

A rating of 5 is excellent and 0 is bad. The Brookfield viscosity of the formulated varnish was 925 mPa·s. After 21 days the viscosity was measured again and a value of 863 mPa·s was found indicating that the product has an excellent viscosity stability.

EXAMPLE 9

A 3 liter reactor was charged with 900 grams of deionized water and 16 grams of sodium lauryl sulfate. The reactor contents were heated to 80° C. while creating a nitrogen atmosphere in the reactor. The nitrogen atmosphere was maintained throughout the whole polymerization process. When the reactor reached 80° C., a solution of 1 grams ammonium persulfate dissolved in 50 grams deionized water was added to the reactor. The water-soluble inorganic salt concentration of the pre-charge as calculated from the specifications of the raw materials was below 1.5 g/kg. Immediately after that, the first monomer feed was fed into the reactor in 1 hour. The first monomer feed consists of 16 grams of n-dodecyl mercaptan, 50 grams methacrylic acid and 350 grams methyl methacrylate. The batch was kept at 80° C. for another 15 minutes. A second monomer feed consisting of 200 grams of methyl methacrylate and 200 grams of butyl acrylate was started and dosed into the reactor over a period of 60 minutes. Simultaneously the addition of a solution of 1 grams ammonium persulfate dissolved in 50 grams deionized water was started. The solution was metered into the reactor of a period of 70 minutes. After the end of the additions, the batch was kept at 80° C. for an additional 60 minutes. After the holding period the batch was cooled to ambient temperature. The resulting polymer dispersion had a solids content of 43%, a pH of 2.7 and a Brookfield viscosity of 7850 cPa·s. The particle size (PSF) was measured as 54 nm and a dL-(clarity) value of 30 was found.

COMPARATIVE EXAMPLE 9

A polymer dispersion was prepared as in Example 9 except that a solution of 3.75 (instead of 1) grams ammonium persulfate was used such that the water-soluble inorganic salt concentration of the pre-charge was above 3.0 (instead of below 1.5) g/kg. In the second polymerisation step a solution of 3.75 (instead of 1) grams ammonium persulfate dissolved in 50 grams deionized water was used. The resulting polymer dispersion had a solids content of 42%, a pH of 2.3 and a Brookfield viscosity of 15 cPa·s. The particle size (PSF) was measured as 107 nm and a dL-value of 6 was found.

Thus, the invention has been described by reference to certain embodiments discussed above. It will be recognized that these embodiments are susceptible to various modifications and alternative forms well known to those of skill in the art. Modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for the preparation of an aqueous dispersion of hydroplasticisable multiphase vinyl polymer particles comprising,
 (1) a first polymerization step comprising
  (1a) preparing an emulsion (1A) in water of a first monomer mixture (1a1), a surfactant (1a2) and water soluble inorganic salt (1a3),
   wherein the first monomers mixture (1a1) comprises
    1) carboxylic acid functional monomers,
    2) optional crosslinking monomers other than 1
    3) vinyl monomers other than 1) and 2) and
    4) optional chain transfer agents,
   wherein surfactant (1a2) is a sulfur based anionic surfactant containing less than 50 wt % ethylene oxide and
   wherein the water soluble inorganic salt (1a3) content at the start of polymerization (1b) is between 0.01 and 3 gr/kg water,
  (1b) emulsion polymerizing the obtained emulsion 1A forming a hydroplasticisable first stage polymer particle dispersion (1B) said first stage polymer having a Tg calculated from the Fox equation from 10 to 125° C.,
   wherein the first particle dispersion (1B) has a particle size below 50 nm (Z average mean as measured by dynamic light scattering),
 (2) a second polymerization step comprising
  (2a) adding to dispersion 1B a second monomer mixture (2a1) comprising
   1) monomers chosen from the same group as in the first monomer mixture (1a1)
   2) optional monomers (2a2) comprising 2 or more ethylenically unsaturated groups for pre-crosslinking,
   wherein carboxylic acid functional monomers in the second monomer mixture is present in an amount such that the acid value of the resulting second polymer is less than 23 mg KOH/g and
   wherein the amount of monomer mixture (2a1) is between 10 and 90 wt % of the total weight of monomer mixtures (1a1) plus (2a1)
  (2b) polymerizing second monomer mixture (2a1) to form a second stage polymer in the first particle dispersion (1B) to form a multiphase particle dispersion (2B)
 (3) optionally hydroplasticising the multiphase particle dispersion (2B) by addition of base, to a pH between 6.5 and 10,
 (4) optionally adding a separate crosslinking agent for reaction with crosslinking monomers in monomer mixtures (1a1) or (2a1) or with unsaturated groups (2a2).

2. The process according to claim 1, wherein in the polymerization step (2b) the multiphase particles in the multiphase particle dispersion (2B) have an average particle size of less than 80 nm (Z average mean as measured by dynamic light scattering).

3. The process according to claim 1, wherein the multiphase particle dispersion (2B) has a transparency value of at least 35 at a solids content of at least 35 wt %.

4. The process according to claim 1, wherein the first monomer mixture (1a1) comprises
 1) 1-45 wt % carboxylic acid functional monomers (wt % relative to the total weight of monomers in the first monomer mixture)
 2) 0-20 wt % optional crosslinking monomers other than 1,
 3) 98.5-50 wt % vinyl monomers other than 1) and 2),
 4) optional chain transfer agents.

5. The process according to claim 1, wherein the amount of surfactant (1a2) is less than 2 wt % relative to the total amount of the first monomer mixture (1a1).

6. The process according to claim 1, wherein the surfactant (1a2) is chosen from the group of salts of alkylethoxylate sulfates and sulfonates, alkylphenolethoxylate sulfates and sulfonates, alkylsulfates and sulfonates, alkylaryl sulfonates, sulfosuccinates, sulfur-based surfactants containing less than 50 wt % ethylene oxide, sulfur-based surfactants having an ethylenically unsaturated bond that can participate in a free radical polymerization and mixtures thereof.

7. The process according to claim 1, wherein before the start of the second polymerisation the pH is adjusted only to such extent that the first polymer is not neutralised and solubilised and the particles remain particles with a measurable particle size.

8. The process according to claim 1, further comprising a step (3) comprising hydroplasticising the multiphase particle dispersion (2B) by addition of base, to a pH between 6.5 and 9.

9. The process according to claim 8, further comprising a step (4) comprising adding a separate crosslinking agent for reaction with crosslinking monomers in the first or second stage polymer or with unsaturated groups from pre-crosslinking monomer (2a2) in the second stage polymer.

10. The process according to claim 9, further comprising step (5) comprising adding another aqueous polymer.

11. A multiphase vinyl polymer particle dispersion obtainable according to the process according to claim 1.

12. The multiphase hydroplasticised vinyl polymer particle dispersion according to claim 11, wherein the multiphase particles have an average particle size of less than 80 nm and comprise less than 20 wt % of particles having a particle size more than 80 nm.

13. The multiphase vinyl polymer particle dispersion according to claim 11, having a transparency value of at least 35 (dL) at a solids content of at least 35 wt %.

14. The multiphase vinyl polymer particle dispersion according to claim 11, comprising neutralised hydroplasticized first stage polymer and having a pH between 6.5 and 10.

15. The multiphase vinyl polymer particle dispersion according to claim 11, comprising not-neutralised hydroplasticisable first stage polymer and having a pH between 4 and 7.

16. A coating composition comprising the multiphase vinyl polymer particle dispersion according to claim 14 and one or more further coating additives.

17. A process for preparing coating composition comprising providing a hydroplasticisable dispersion 2B obtained by a process comprising,
(1) a first polymerization step comprising
 (1a) preparing an emulsion (1A) in water of a first monomer mixture (1a1), a surfactant (1a2) and water soluble inorganic salt (1a3),
 wherein the first monomers mixture (1a1) comprises
  1) carboxylic acid functional monomers,
  2) optional crosslinking monomers other than 1
  3) vinyl monomers other than 1) and 2) and
  4) optional chain transfer agents,
 wherein surfactant (1a2) is a sulfur based anionic surfactant containing less than 60 wt % ethylene oxide and
 wherein the soluble inorganic salt (1a3) content at the start of polymerization (1b) is between 0.01 and 3 gr/kg water,
 (1b) emulsion polymerizing the obtained emulsion 1A forming a hydroplasticable first stage polymer particle dispersion (1B) said first stage polymer having a Tg calculated from the Fox equation from 10 to 125° C.
(2) a second polymerization step comprising
 (2a) adding to dispersion 1B a second monomer mixture (2a1) comprising
  1) monomers chosen from the same group as in the first monomer mixture (1a1)
  2) optional monomers (2a2) comprising 2 or more ethylenically unsaturated groups for pre-crosslinking, preferably in an amount less than 2 wt %,
 wherein carboxylic acid functional monomers in the second monomer mixture is present in an amount such that the acid value of the resulting second polymer is less than 23 mg KOH/g and
 wherein the amount of monomer mixture (2a1) is between 10 and 90 wt % of the total weight of monomer mixtures (1a1) plus (2a1)
 (2b) polymerizing second monomer mixture (2a1) to form a second stage polymer in the first particle dispersion (1B) to form a multiphase particle dispersion (2B)
(3) hydroplasticising the multiphase particle dispersion (2B) by addition of base, preferably a volitile base, to a pH between 6.5 and 10,
(4) optionally adding a separate crosslinking agent for reaction with crosslinkink monomers in monomer mixtures (1a1) or (2a1) or with unsaturated groups (2a2),
wherein hydroplasticable dispersion 2B is formulated to a coating composition by addition of coating additives before or during the hydroplasticising step (3).

18. The multiphase vinyl polymer particle dispersion of claim 15 implemented into a wood coating composition having a pH between 4and 8.

19. The process according to claim 1, wherein base is a volatile base.

20. The process according to claim 1, wherein pH in step (3) is 9.

21. The process according to claim 7, wherein the pH at the start of the second polymerisation being below 7.

22. The process according to claim 8, wherein the base is a volatile base.

23. The multiphase vinyl polymer particle dispersion according to claim 11, comprising neutralised hydroplasticized first stage polymer and having a pH of 6.5.

* * * * *